Inventor
Roland V. Hutchinson
By Blackmore, Spencer & Hurd
Attorney

Patented Feb. 16, 1932

1,845,152

UNITED STATES PATENT OFFICE

ROLAND V. HUTCHINSON, OF LANSING, MICHIGAN, ASSIGNOR TO GENERAL MOTORS RESEARCH CORPORATION, OF DETROIT, MICHIGAN, A CORPORATION OF DELAWARE

GASEOUS FUEL MIXING DEVICE

Original application filed August 19, 1927, Serial No. 214,096. Divided and this application filed February 8, 1929. Serial No. 338,429.

This invention relates to superchargers or gaseous fuel mixing devices and has particular reference to superchargers of the centrifugal type applied to internal combustion engines.

In superchargers of the centrifugal type which are used to withdraw carbureted fuel from a carburetor and force it to the engine cylinders, there is always present the disadvantage of having some of the fuel condense in the supercharger which decreases the efficiency of the explosive mixture.

It is an object of the present invention to provide a means by which the condensed fuel will be returned to the throat or inlet of the supercharger to be delivered at the center of the rotating blades and be repulverized or re-atomized due to the speed of the supercharger blades.

The object of the invention is accomplished by providing a trough or channel in the compression chamber of the supercharger and connecting this trough or channel to the throat of the supercharger by means of a plurality of tubes. Fuel which will be condensed in the compression chamber will fall into the channel and due to the suction or pressure difference between the inlet and outlet the condensed fuel will be returned from the trough to the throat through the tubes. As it reaches the throat it will be drawn by the air stream into the center of the supercharger to be thrown outwardly by the rapidly revolving blades which will cause its re-atomization and return to the fuel mixture.

This application is a division of my prior application, Serial No. 214,096, filed August 19, 1927, Patent 1,761,921.

Figure 1:
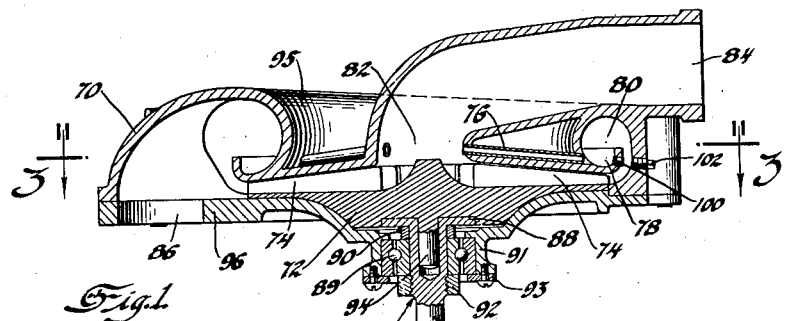
Figure 1 is a sectional view through the supercharger.
Figure 2:
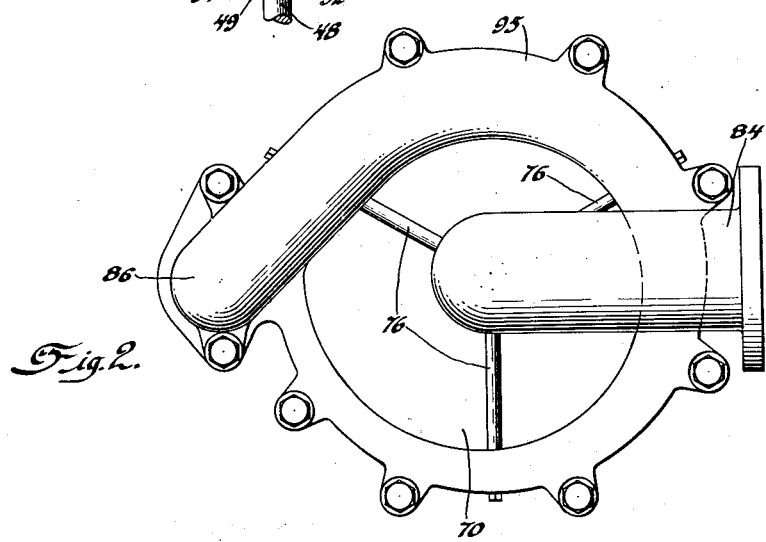
Figure 2 is a plan view of the structure of Figure 1.

Referring to the drawings, the supercharger of the present invention is shown as a whole at 70 and is preferably though not necessarily placed above the engine. The supercharger is generally of the conventional centrifugal type and has the blades 74 and the usual rotor 72 driven by shaft 48. The essential feature of the supercharger is the provision of a plurality of tubes 76 which extend to the throat or inlet 82 from a gutter or trough 78 provided within the compression chamber 80 of the supercharger. Only one of these tubes is shown in Fig. 1, but as many as desired may be provided, three tubes being shown in Fig. 3. When the rotor 72 is in operation the pressure difference between the compression chamber 80 and the inlet 82 will cause a flow through the tube 76 and any unvolatilized or condensed fuel which has reached the compression chamber 80 will fall into the trough 78. By returning the unvolatilized fuel to the inlet 82, the speed with which it is driven through the rotor will tend to break it up into the atomized state. The entrance from the carburetor is shown at 84 and the outlet to the engine is shown at 86.

The shaft 48 is secured to the rotor 72 as shown at 49 in Figure 1. The shaft has a flange 88 to which the rotor 72 is secured. The shaft end is hollow to receive a pin 94 integral with the rotor. A ball bearing 89 surrounds the shaft and is spaced from the flange 88 by a collar 90. The bearing 89 is positioned in an extension 91 of the lower portion 96 of the supercharger housing 95 and is held in place by a nut 92 and the cover member 93.

The openings for the tubes 76 are preferably formed by drilling from the outside of the housing toward the inside and the openings in the housing side and in the flange of the trough 78 are then closed by means of plugs or studs 100 and 102 respectively.

The operation of the structure is as follows: The carbureted fuel will be drawn in at the connection 84 and delivered to the throat or inlet 82 where it will be received by the blades 74 of the rotor 72 and due to centrifugal action will be forced outwardly and compressed in the compression chamber 80 and leave by the outlet 86. Any condensed or unvolatilized fuel in the compression chamber will fall or be thrown by the air stream against the compressor walls and flow down and be caught in the trough or channel 78. When the fuel reaches the bottom of the trough, it will be drawn from the trough by the suction or pressure difference between the two ends of the tubes 76 and delivered to the throat 82 where it will be taken up by the rotor and re-atomized due to the rotor speed.

Figure 3:
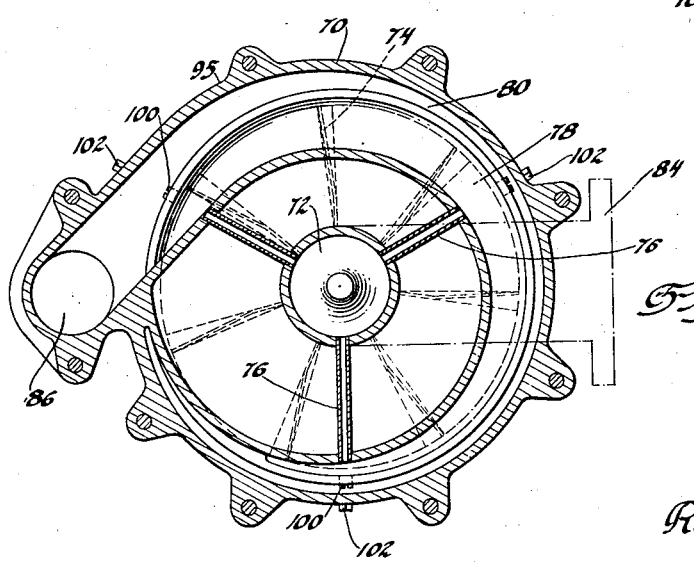
Figure 3 is a section on the line 3—3 of Figure 1.

In Figure 3, I have shown three tubes, but two or more as desired may be used. While it is possible to use one tube, a plurality of tubes is preferred.

I claim:

1. In a gaseous fuel mixing device, a rotor, a fuel mixture inlet delivering fuel mixture to the rotor, a compression chamber, a trough in said chamber, means for returning unvolatilized or liquid fuel from the trough to the inlet, and an outlet for said mixture.

2. In a gaseous fuel mixing device, a rotor, a fuel mixture inlet delivering fuel mixture to the center of the rotor, a compression chamber concentric with said inlet, a trough in said chamber, means between said trough and inlet for returning unvolatilized or liquid fuel to said inlet, and an outlet to said device.

3. In a gaseous fuel mixing device, a rotor, a fuel mixture inlet delivering fuel mixture to the rotor, an outlet, and a plurality of passages for causing unvolatilized or liquid fuel to be returned to the inlet.

4. In a gaseous fuel mixing device, a rotor, a fuel mixture inlet delivering fuel mixture to the rotor, a compression chamber in said device, and a plurality of passages for causing liquid or unvolatilized fuel to be returned from the chamber to the inlet.

5. In a gaseous fuel mixing device, a rotor, a fuel mixture inlet for delivering fuel mixture to said rotor, a compression chamber, a trough in said chamber, an outlet, and tubular means between said trough and inlet to permit the return of liquid or unvolatilized fuel to the inlet.

6. In a gaseous fuel mixing device, a rotor, a fuel mixture inlet for delivering fuel mixture to the rotor, an outlet, a compression chamber, and a plurality of tubes between said chamber and inlet for permitting the return of liquid or unvolatilized fuel to the inlet.

7. In a gaseous fuel mixing device, a rotor, a fuel mixture inlet for delivering fuel mixture to the rotor, a compression chamber in said device, a trough in said chamber, and a plurality of tubes between said trough and inlet to permit the return of liquid or unvolatilized fuel to said inlet.

In testimony whereof I affix my signature.

ROLAND V. HUTCHINSON.